United States Patent
Niccum et al.

[15] 3,647,083
[45] Mar. 7, 1972

[54] SLIP-ON FILTER STRUCTURE

[72] Inventors: Forest G. Niccum, Skokie; Walter J. Kudlaty, Elmhurst; Charles W. Dauer, Arlington Heights; Peter Heinrich, Jr., Chicago, all of Ill.

[73] Assignee: Marvel Engineering Company, Chicago, Ill.

[22] Filed: Apr. 16, 1970

[21] Appl. No.: 29,104

[52] U.S. Cl.....................210/236, 210/345, 210/437, 210/457, 210/460
[51] Int. Cl..........................................B01d 27/06
[58] Field of Search.................210/232, 236, 254, 323, 345, 210/440, 441, 437, 457, 460, 463

[56] References Cited

UNITED STATES PATENTS

| 3,262,565 | 7/1966 | Silverwater | 210/440 X |
| 3,539,009 | 11/1970 | Kudlaty | 210/232 X |
| 3,337,056 | 8/1967 | Stripp | 210/440 |
| 3,058,592 | 10/1962 | Nugent | 210/437 X |
| 3,503,511 | 3/1970 | Spitzberg | 210/232 |
| 3,314,542 | 4/1967 | Kudlaty | 210/236 |

FOREIGN PATENTS OR APPLICATIONS 1,071,671  12/1959  Germany..............................210/232

Primary Examiner—Samih N. Zaharna
Assistant Examiner—Frederick F. Calvetti
Attorney—Parker, Carter & Markey

[57] ABSTRACT

A filter assembly having a normally fixed core and manually replaceable filter elements.

2 Claims, 5 Drawing Figures

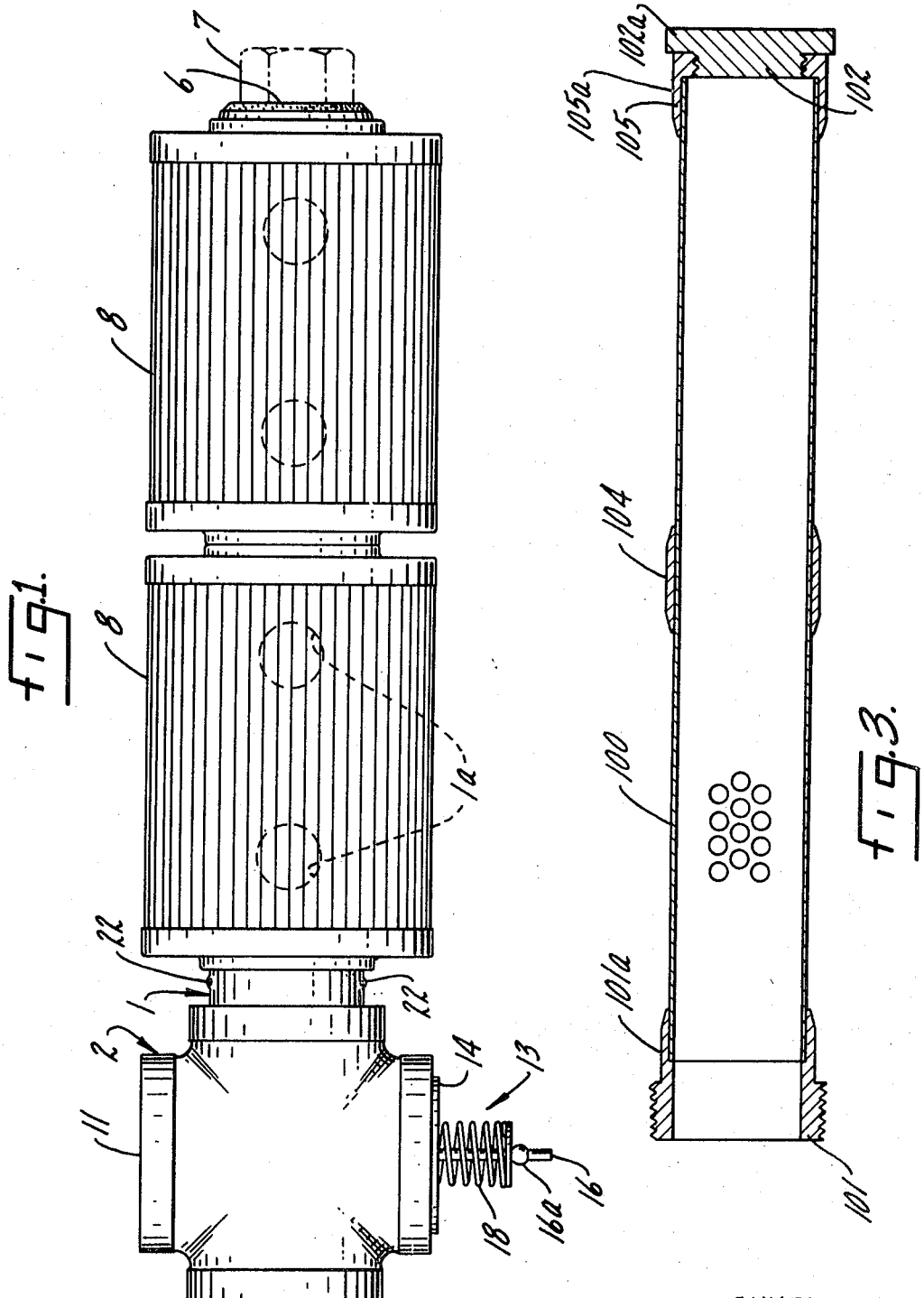

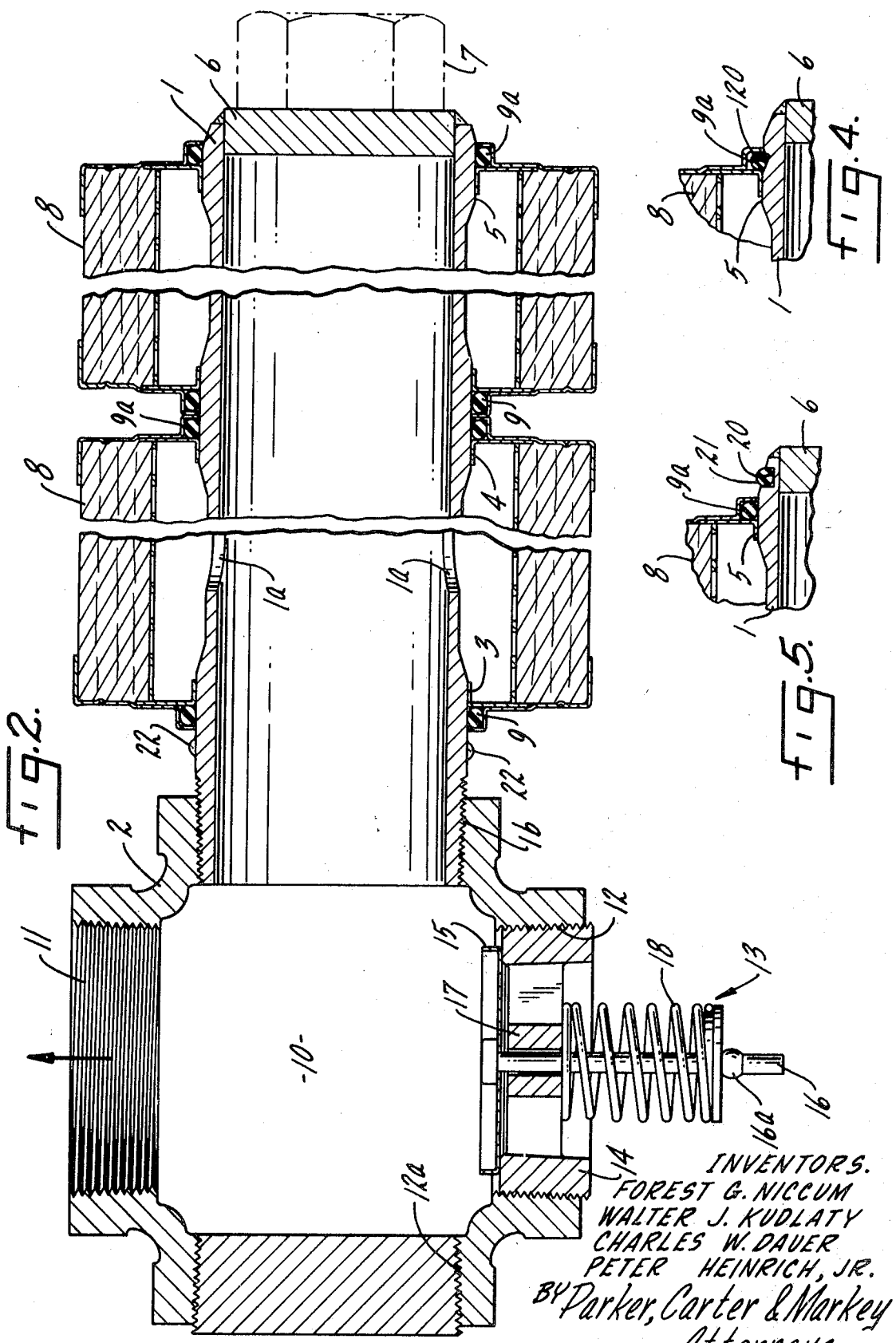

SLIP-ON FILTER STRUCTURE

SUMMARY OF THE INVENTION

This invention relates to filters and particularly to sump type fluid filters.

One purpose of the invention is to provide a slip-on filter structure having fixed elements formed and adapted for reception and exchange of filter elements with maximum ease and facility.

Another purpose is to provide a slip-on filter structure having means facilitating the exchange of filter elements without the use of tools.

Another purpose is to provide a filter structure having a fixed core member and a removable filter element.

Another purpose is to provide a sump-type suction filter structure with means facilitating exchange of filter elements thereon.

Another purpose is to provide a filter assembly of maximum economy in construction and use.

Another purpose is to provide a filter structure having fixed core and bypass means and manually replaceable filter element means.

Another purpose is to provide for use of disposable filter elements in a sump-type filter assembly.

Other purposes may appear from time to time during the course of the specification and claims.

BRIEF DESCRIPTION OF THE DISCLOSURE

The invention is illustrated more or less diagrammatically in the accompanying drawings, wherein:

FIG. 1 is a plan view;

FIG. 2 is a plan view in cross section with portions broken away;

FIG. 3 is a detail view of a variant element of the invention;

FIG. 4 is a detail of a further variant element; and

FIG. 5 is a detail view of a further variant element of the invention.

Like parts are indicated by like numerals throughout the specification and drawings.

DESCRIPTION OF THE PREFERRED EMBODIMENT

Referring now to the drawings, the numeral 1 generally designates an elongated, hollow, tubular metal core having openings 1a in the circumferential wall thereof. The core 1 may be formed of tubing with stamped or drilled holes or may, for example, be a casting with cored holes. At one of its ends the core 1 is connected to a fitting 2 formed and adapted for communication with the inlet part of a pump (not shown) and for attachment to a suitable structure (not shown) such as the wall of a fluid reservoir or sump having at a point adjacent the lower portion thereof.

Adjacent the opposite ends of tube 1 and spaced at desired intervals along the tube 1 are circumferential enlargements or lands 3, 4 and 5, for example. The land 3 has its inner surface and lands 4,5 have their opposite end surfaces chamfered or inclined toward the tube 1 as shown. A closure or plug 6 is secured to and in the opposite end of tube 1 from the open end secured, as by threads 1b, to fitting 2. The closure 6 may have an optional nut configuration 7, shown in phantom lines, secured thereto to facilitate engagement of threads 1b with fitting 2 or of the threads 1b with a similar outlet connection for the sump (not shown) with which the assembly of the invention is employed.

As may be clearly seen in the drawings, a filter element 8 is slidable along and about the core 1. Filter element 8 carries at its opposite ends the O-ring seals 9,9a, the inner surfaces of which are exposed for sealing engagement with the outer surfaces of the lands, such as those shown at 3, 4 and 5.

It will be observed that the nipple or fitting 2 may define an internal chamber 10 with which the area within core 1 communicates. The chamber 10 communicates through outlet 11 with a suitable suction source such as the pump referred to above. Opening 12 is formed in fitting 2 and receives therein the bypass structure 13. When desired, a second structure 13 may be positioned in a second opening 12a formed for the purpose in fitting 2. Included in the bypass structure 13 is a sleeve 14 externally threaded for reception in the internally threaded opening 12. The inner end of sleeve 14 is closed by a bypass valve member 15. Valve stem 16 extends from member 15 through a bore in the spider web 17 carried by sleeve 14. A spring 18 is retained by the web 17 and a head 16a on stem 16 to urge the valve member 15 toward its seat formed by the inner, annular surface of sleeve 14.

As shown in FIG. 3, the core may be formed of perforated sheet metal rolled to form a tube as indicated at 100. To the outlet end of core 100 a threaded sleeve 101 may be attached to the opposite end of core 100 a closure plug 102 may be secured. Lands equivalent to the lands 3 and 4 may be formed of extensions 101a on sleeve 101 and 105a on a sleeve 105 which threadably receives plug 102. Individual sleeves such as that shown at 104 may be soldered at desired spaced points along the core 100 to serve the function of land 4.

The use and operation of the invention are as follows:

With the tube or core 1,100 positioned, for example, in the lower area of a fluid reservoir, one or more filter elements 8 are slidably placed on the core, the seals 9,9a of the element 8 sealingly engaging the appropriate lands. Thereupon suction applied to the area within the core will draw the fluid in the reservoir through the filter element or elements 8 and the perforated or apertured wall of the core and fitting 2 to the suction source, such as a suction pump (not shown) or the like. A closure, such as those shown at 6,102, insures against passage of unfiltered fluid through the core.

It will be understood that the suction action of the fluid through the filters 8 and the core may be relied upon to retain the filter elements in position when the device is employed as a sump or suction filter in the lower portion of a reservoir. Alternatively, as shown in FIG. 4, groove 120 may be formed in the lands 3,4,5,101a,104,105a for reception of the inner portions of seals 9,9a and a resultant combination of sealing and retention of the filter elements 8 against axial retrograde movement on the core 1.

As shown in FIG. 5, an external groove 20 may be formed adjacent the closed end of core 1 and a resilient ring 21 may be carried therein and extend therefrom for retention of the filter element or elements 8 on the core 1. The ring 21 may be rectangular in cross section or may be the O-ring shown. As seen in FIG. 3, closure 102 carries annular flange 102a of sufficient diameter to retain elements 8, placement of closure 102 being required after placement of elements 8 when flange 102a is employed. Inward movement of the filter element or elements 8 may be restricted by the fitting 2, by an additional enlargement or offset of the core 1, by the circumferentially spaced spot welds shown at 22 in FIG. 2 or by the shoulder at the base of the extension 101a as seen in FIG. 3.

It will be observed that the lands 3,4,5,101a,104,105a are of sufficient axial extension to permit of some flexibility in the precise positioning of the elements 8 on the core, while continuing to insure that the elements 8 surround the apertures in the wall of the core. Each of the elements 8 is supported by the resilient seals 9,9a, providing a stable, vibration-resistant construction and tending further to reduce any tendency toward dislodgement of the element or elements 8.

While, as shown, the core carries two elements 8, it will be understood that the number of elements 8 may be varied depending upon available space and the desired filtering area and volume involved, the core 1,100 being of a corresponding length for reception of one, two or more filter elements 8.

When the bypass valve assembly 13 is employed a buildup of contaminants on the filter element or elements 8 will cause a pressure differential on the opposite sides of valve member 15, whereupon the valve member or members 25 will open to bypass fluid through the fitting 2 and outlet 11 to the source of suction.

Thus it will be realized that a fixed member, i.e., the tube or core 1,100 may be provided and left undisturbed throughout the operation of a sump filter, for example. Filter elements 8 may be installed by simple manual movement of the elements 8 along the core, the inclined surfaces on the lands 3,4,101a,104105a serving to facilitate movement of the seals 9,9a onto and off the lands. When a filter element has become contaminated, the operator merely reaches into the reservoir and manually slides the contaminated element off the tube 1, replacing it with a clean filter element.

Thus a substantial filtering area defined by the fixed, elongated core and the filter element or plurality of filter elements 8 slidably surrounding the core throughout its length is accomplished at minimum cost and made effective over a long life of filter element replacement by manual means. Moreover, the total cost of operating and maintaining a sump filter is substantially reduced over an extended period of operation by the fact that such continued operation requires the replacement of only the filter elements 8, the latter being made of maximum economical construction. The strength made available by the fixed, rigid core, for example, may enable the use of disposable paper filter elements where wire mesh elements have been previously employed.

The embodiments of the invention in which an exclusive property or privilege is claimed are defined as follows:

1. A slip-on filter assembly comprising an elongated, hollow, tubular core having openings in its circumferential wall, a fitting configuration at one end of said core and formed and adapted for securing said core to a fixed structure, circumferential lands surrounding the external surface of said core at axially spaced points thereon, said openings being located between said lands, the opposite end of said core being closed, a filter element structure slidably received on and slidably removable from said core, said filter element structure having a length less than that of said core and seal elements carried by said filter element structure and sealingly engaging the circumferential external surfaces of said lands, said lands including ramp areas bordering said circumferential surfaces and inclined toward said core for initial contact by said seal elements, said filter element structure being out of contact with said core except through said seal elements.

2. The structure of claim 1 wherein said lands include a land at one end of said core, a land at the opposite end of said core and at least one land intermediate the ends of said core.

* * * * *